United States Patent [19]

Volz et al.

[11] Patent Number: 4,977,472
[45] Date of Patent: Dec. 11, 1990

[54] SERVO ADDRESS SYSTEM

[75] Inventors: Le Roy A. Volz, Northridge; Mark E. Pease, Newbury Park, both of Calif.

[73] Assignee: Seagate Technology, Inc., Scotts Valley, Calif.

[21] Appl. No.: 173,770

[22] Filed: Mar. 28, 1988

[51] Int. Cl.[5] .......................... G11B 5/55; G11B 5/596
[52] U.S. Cl. .................................. 360/78.140; 360/49; 360/77; 360/50; 360/135
[58] Field of Search ............... 360/49, 77.04, 77.05, 360/77.02, 77.07, 77.11, 78.04, 78.14, 135, 77.08; 369/32, 33, 41

[56] References Cited

U.S. PATENT DOCUMENTS 3,691,543 9/1972 Mueller ........................... 360/77.02
4,682,253 7/1987 Leslie ............................. 360/77.07

FOREIGN PATENT DOCUMENTS 8301859 5/1983 PCT Int'l Appl. .................. 360/49

OTHER PUBLICATIONS

IBM TDB, vol. 25, No. 2, "Dicell Gray Coding of Disk File Addresses", 7/82, Pennington, pp.376-377.
IBM TDB vol. 20, No. 5, "Phase and Location Coded Servo Pattern For Controlling the Magnetic Head in Track Seek and Track Follow Operations" Schaller, 10/77, pp. 1792-1794.

Primary Examiner—Aristotelis M. Psitos
Assistant Examiner—Steven R. Garland
Attorney, Agent, or Firm—Kelly, Bauersfeld & Lowry

[57] ABSTRACT

A dedicated servo disk is encoded with a plurality of bit frames. Each bit frame is positioned between synchronizing bits. Each bit frame contains a first and second portion in timed succession and a plurality of servo bits are arranged in first and second distinct patterns. A bit frame can contain an intermediate code bit with a plurality of intermediate code bits and quadrature position signals used to form the unique track address. The track address is repeated throughout the associated servo track. The dedicated servo disk is used in an servo address system.

15 Claims, 4 Drawing Sheets

SERVO ADDRESS SYSTEM

BACKGROUND OF THE INVENTION

This invention relates generally to servo seeking and tracking systems for use in computer disk drive units and the like. More specifically, this invention relates to an improved servo seeking and tracking system wherein unique track address information is prerecorded onto a dedicated servo surface and monitored during operation of the disk drive unit to identify and correct seeking and tracking errors.

In recent years, microcomputer equipment particularly such as so-called personal and desk top computers have become extremely popular for a wide variety of business and educational and other uses. Such computers commonly include a main central processor unit having one or more memory storage disks for storage of data. In many modern computers, the storage disk or disks, sometimes referred to as "hard disks," are provided as part of a Winchester-type disk drive unit having the storage disks supported in a stack on a rotary spindle within a substantially sealed disk drive housing. The disks are rotatably driven in unison by a small spindle motor within the disk drive housing, and one or more electromagnetic heads are displaced by a head positioner assembly to traverse surfaces of the rotating disks for purposes of reading and writing data. Such Winchester-type disk drive units are generally preferred in comparison with so-called floppy disk drives due to their higher memory storage capacities and faster operating speeds.

For a typical Winchester-type disk drive, data is recorded onto magnetizable surfaces or surface films on the memory storage disks in the form of data bits adapted to be encoded and decoded in binary form. The data is recorded within the confines of narrow concentric tracks defined on the disk surfaces, with track densities in the range of 500 to 1,000 and more tracks per inch being relatively well known. Accordingly, the total memory storage capacity for any selected disk drive unit is directly proportional to the number of available of data tracks. When the disk drive unit includes multiple storage disks, the total number of available data tracks and thus the total memory storage capacity is increased.

In normal operation of a Winchester-type disk drive unit, a system controller is provided for identifying the location of data which has been recorded upon the storage disks, typically through the use of directory name, file name, and/or data address information. When reading of specific data track is desired, the system controller signals a head positioner assembly to displace the heads to the desired position accessing the data. Alternately, when data recording or writing is desired, the system controller signals disk drive circuitry to command the positioner assembly to displace the heads in a manner aligning one head with a vacant data track. Importantly, for accurate track seeking and head alignment therewith, detectable servo information is normally prerecorded onto one or more of the memory storage disks.

In accordance with one known servo seeking and tracking system, each surface of each disk includes servo information prerecorded within radially spaced servo segments or sectors. This type of servo system, commonly known as an "embedded" servo system, provides data which is read by the operating head for purposes of seeking and tracking with a designated data track. During head traverses to seek a new specified data track, the head responds to embedded track address information within the servo sectors to identify a specified destination track. While such embedded servo systems have functioned generally satisfactorily, such systems inherently include track seek or access speed limitations due primarily to the limited sample rate at which the head can read and respond to servo information within the servo sectors. This inherent seek speed limitation is rendered more significant when relatively high track densities are used. Moreover, an embedded servo system fixes the number of available data and servo sectors in a manner which is incompatible with some types of controller interfaces.

So-called "dedicated" servo surface systems are also generally known in the art, wherein servo seeking and tracking information is prerecorded onto one surface of a memory storage disk in a disk drive unit having multiple disks. The servo seeking and tracking information is detected by an associated servo head for purposes of displacing and aligning a group of data heads with a designated data track, or to identify track crossings during a seek/access step. Such dedicated servo surface systems are preferred in certain multiple disk microcomputer applications since they can provide an overall increased data storage capacity to the disk drive unit. However, similar to the embedded servo systems described above, track seek/access errors can arise as a result of small disk imperfections which can generate false track crossing readings. Moreover, to prevent head overshoot during a seek step, head deceleration at the conclusion of the seek step must normally be designed for a relatively slow, worst case condition.

There exists, therefore, a significant need for an improved servo seek/tracking and related track address system for use in computer disk drive units, wherein the system is relatively simple and operates automatically to prevent and/or correct track seek and head positioning errors. The present invention fulfills these needs and provides further related advantages.

SUMMARY OF THE INVENTION

In accordance with the invention, a servo address system is provided with unique, positive address identification for each of a large plurality of concentric tracks on a dedicated servo surface in a computer disk drive unit. The servo address system comprises a pattern of servo data prerecorded onto the dedicated servo surface for detection by a servo head during operation of the disk drive unit. The detected servo data comprises a unique data pattern for each track or group of tracks, wherein the data pattern may be represented in binary code to define a unique track address. The servo system responds to the address information to verify head position for purposes of preventing seeking and tracking step errors.

In accordance with the preferred form of the invention, the dedicated servo surface comprises one side of one of a plurality of memory storage disks arranged in a computer disk drive unit for rotation as a group about a common spindle axis. A head positioner assembly carries a plurality of electromagnetic heads in individual flux-coupled association with the disk surfaces, for example, with two heads being provided on opposite sides of each memory storage disk. One of the heads comprises the servo head for reading the servo data on the dedicated servo surface, whereas the remaining heads comprise data heads for reading and/or writing data relative to their respective disk surfaces. A conventional system controller operates through appropriate disk drive circuitry to command a head positioner assembly to displace all of the heads as a group with respect to the disk surfaces. The servo head tracks the servo data throughout such displacement to identify and verify the position of the servo head, thereby also identifying and verifying the position of the data heads.

The data pattern prerecorded onto the servo surface comprises, for each track, a plurality of bit frames each including at least one and preferably a sequence of data bits, wherein the bit frames are repeated in groups with each frame group defining a unique address corresponding with a specific track. The frame groups thus provide a repeating address detectable by the servo head throughout each disk revolution.

In the preferred form of the invention, the repeating frame groups provide unique address information corresponding with a small annular band of adjacent tracks on the servo disk, such as four adjacent tracks. The data bits within the bit frames represent primary digits of a binary address code unique to the small band of tracks. These primary digits are combined with secondary digits derived from a comparison of servo head position error signals in quadrature to provide a unique binary address code for each track.

The bit frames are recorded onto the servo surface tracks between a regular succession of synchronizing bits which demarcate the leading and trailing edges of each bit frame. Each bit frame is subdivided into first and second portions having data bits recorded therein with one of two time durations detectable and distinguishable by the servo head. In the preferred form, the data bits are recorded in the first and second portions of each bit frame in combinations of relatively long or relatively short duration bits which represent a "1" or a "0" in binary code. A preferred address is formed by ten successive bit frames, which thus provide a total of ten digits "1" or "0" and combinations thereof to provide the address code unique to the specific track.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
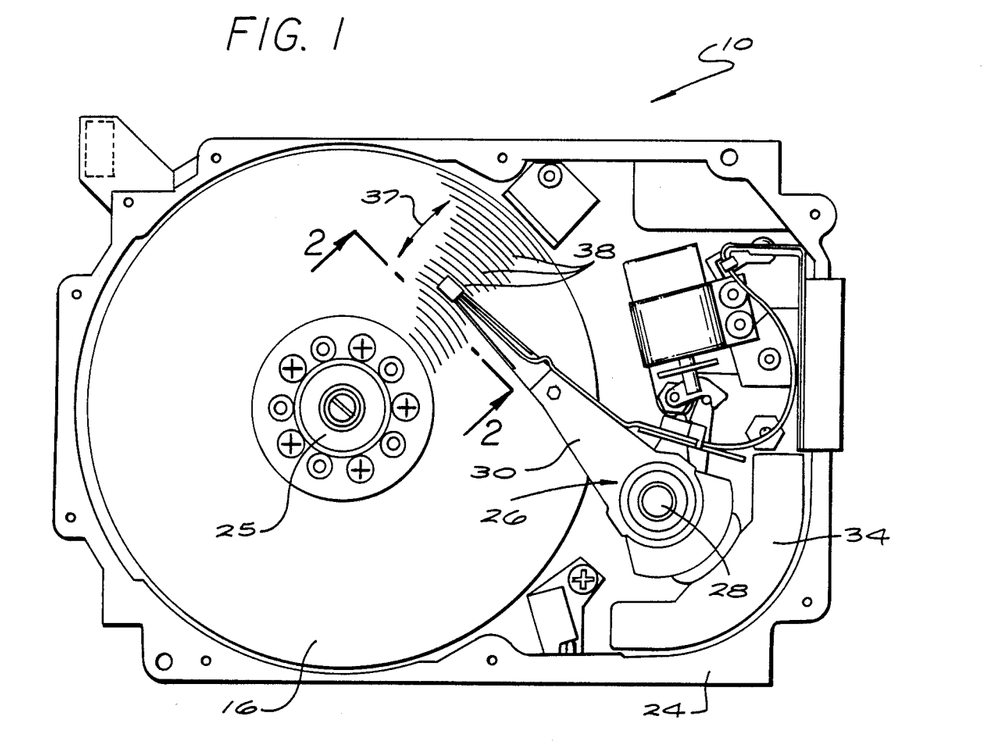
FIG. 1 is a top plan view depicting an exemplary computer disk drive unit of the type adapted to use a servo address system embodying the novel features of the invention.

As shown generally in the exemplary drawings, a servo address system is provided for a computer disk drive unit referred to generally by the reference numeral 10 in FIG. 1. The servo address system utilizes a servo head 12 (FIG. 2) for detecting servo data prerecorded onto a dedicated servo surface 14 on one side of one of a plurality of memory storage disks 16. The remaining surfaces of the storage disks 16 comprise data surfaces 18 for reading and/or writing data through the use of a corresponding plurality of data heads 20. In accordance with the invention, the servo system responds to the prerecorded servo data to verify track position of the various heads, for purposes of identifying and correcting seeking and tracking errors.

The servo address system of the present invention provides the capability for more accurate data seeking and faster data seek times in Winchester-type disk drives used in modern personal and desk top computers. The system utilizes a specific pattern of servo data bits recorded in concentric tracks on the dedicated servo surface 14 to permit the servo head 12 to identify the specific track aligned therewith. The servo system utilizes this identification information to verify alignment with the track designated by a system controller 22 (FIG. 2) and to correct seeking and tracking errors, if present. With this arrangement, the disk drive unit may be designed for faster track seek and data access times in comparison with prior art units, since the servo address system provides means for self-correcting tracking or seek errors which might arise, for example, by slight overshoot of the servo head during a seek operation.

As shown generally in FIG. 1, the computer disk drive unit 10 comprises a so-called "hard" disk drive of the general type used in modern personal computers and the like. The disk drive conventionally includes a substantially sealed housing 24 defined by appropriate interconnected housing members to enclose the various disk drive components. The sealed housing typically has an overall size and shape with generally standardized external dimensions selected to fit within an installation envelope of limited size within the cabinet (not shown) of a central processor unit for a computer. The disk drive housing 24 encases a vertically stacked array of spaced-apart memory storage disks 16 (FIGS. 1 and 2) mounted upon and rotatably driven as a group by a spindle motor 25. The memory storage disks 16 preferably have diametric sizes of about 5.25 inches, or about 3.50 inches, to correspond with standard disk sizes in the computer industry. The multiple disks 16 are mounted within a vertical profile permitting the disk drive unit to fit within a standardized full height dimension of about 3.25 inches, or within a half height dimension of about 1.625 inches. According to a preferred disk drive geometry utilizing the servo address pattern of the present invention, up to five storage disks 16 have been incorporated into a disk drive of half height dimension.

As is known generally in the art, the illustrative disk drive unit 10 includes a head positioner assembly 26 mounted within the sealed housing 24 at a position alongside the disk stack. The head positioner assembly 26 is movably supported by means of a bearing 28 or the like and in turn carries a plurality of individual, generally parallel arms 30 having electromagnetic head at the distal ends thereof. One of these arms 30, such as the lowermost arm (FIG. 2) carries the servo head 12 in close proximity with the dedicated servo surface 14 shown as the underside surface of the lowermost disk 16 in the stack. The remaining heads 20 are disposed in close, flux-coupled proximity with the respective remaining upper and lower disk surfaces, with these remaining heads 20 comprising the data heads for appropriate reading and writing of data on their respective disk surfaces. A suitable positioner mechanism 34 such as a moving coil actuator forms a portion of the head positioner assembly 26 and responds to commands from the system controller 22 (FIG. 2) to displace the heads 12 and 20 as a group through radial traverses relative to their respective disk surfaces, as indicated by arrow 37 in FIG. 1, and in a well known manner. Such traversals of the heads function to align a selected data head 20 with a selected data track 38 on its associated disk surface for purposes of reading and writing data.

In general terms, in accordance with the invention, the dedicated servo surface 14 on the lowermost disk 16 (FIG. 2) includes prerecorded servo data arranged in a predetermined pattern of bits designed to represent a unique address for each of a large plurality of concentric servo tracks. The servo address system includes a servo address reader 39 for interpreting the bit pattern comprising the servo data in a manner permitting accurate servo head seeking and tracking alignment with a specific track, and further permitting the servo head to seek and align with a new track as specified by the system controller 22. Detection of the address data on the dedicated servo surface 14 permits the servo head to identify and verify alignment with the new track at the conclusion of a seek step, or to correct any seeking or tracking error. Importantly, this accurate and self-correcting operation of the servo head 12 permits the remaining data heads 20 to be positioned with great precision, since each one of the data heads 20 moves with the servo head 12 and thus is aligned with the same track on its associated disk data surface.

Figures 3, 4, 5:
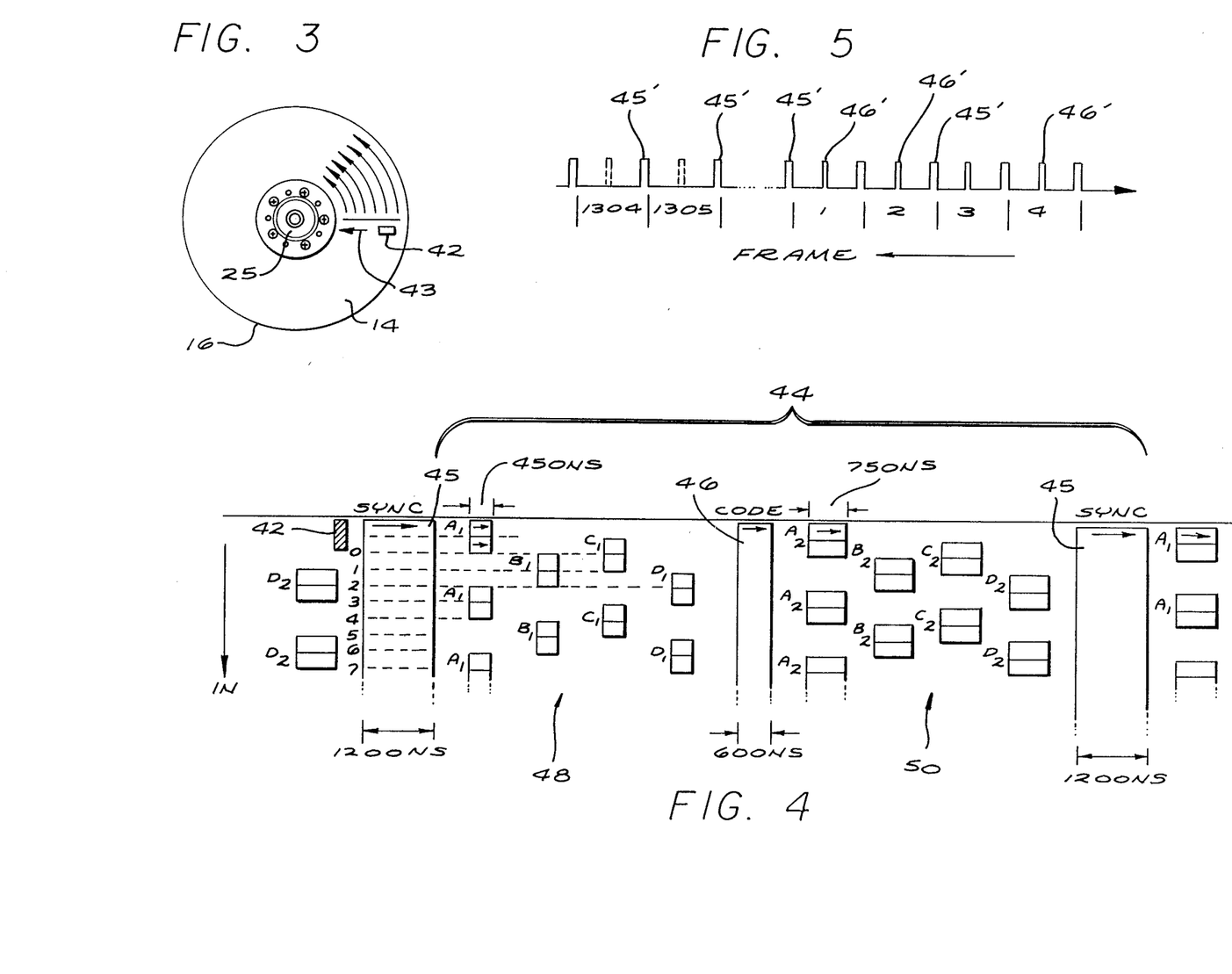
FIG. 3 is a schematic diagram illustrating initial premagnetization of the dedicated servo surface.
FIG. 4 is an enlarged, developed chart depicting a track-to-track pattern of bit frames corresponding with address information on the dedicated servo surface.
FIG. 5 is a graphic representation of peak detected portions of the bit frames shown in FIG. 4, for purposes of identifying and verifying the rotational position of the dedicated servo surface relative to the servo head.

In accordance with a preferred form of the invention, the dedicated servo surface 14 of the lowermost disk 16 is prepared initially by means of a servo track writer 42 at the factory prior to consumer purchase and use of the disk drive. The servo track writer 42 is conventionally coupled to an appropriate electrical current and then displaced in steps through a radial traverse of the rotating disk 16 in close overlying relation with the disk surface 14, as indicated by arrows 43.

The servo track writer 42 is used to apply the desired pattern of servo data onto the disk surface in appropriate concentric tracks. More specifically, with reference to FIG. 4, the servo data pattern is shown with respect to a single bit frame 44 recorded onto a total of eight adjacent tracks identified by numbers "0" through "7" which increase in number in a radially inward direction from the outermost track "0" on the disk. It will be understood, of course, that these illustrative tracks represent a large plurality of approximately 500 to 1,000 or more tracks per inch which may be formed upon the servo surface 14.

The servo track writer 42 records the servo data in the form of a repeating pattern of the bit frames 44 for each discrete servo track. Each bit frame 44 includes an array of servo bits identified generally by the reference letters "A" through "D", wherein these data bits comprise localized flux regions of predetermined direction and time span when the disks are rotated at a normal operating speed, typically about 3,600 rpm. A successive plurality of the bit frames collectively define an "address" which can be detected and recognized by the servo head 12 and the address reader 39 during normal operation of the disk drive, as will be described in more detail. While the number of bit frames 44 per track, i.e. per disk revolution, and the number of bit frames used to define one address may vary, one preferred system arrangement provides a total of ten successive bit frames 44 to define one address which is repeated throughout the track revolution. With bit frames having an individual time span of about 12.8 microseconds, approximately 1,305 bit frames 44 can be recorded onto a single track revolution of a servo surface 14 having a conventional disk diameter of about 3.50 inches. With this arrangement, with ten bit frames per address, the address can be repeated 130 times for each track on the servo surface.

The leading and trailing edges of each bit frame 44 are characterized by synchronizing bits 45 which are recorded onto the servo surface at regular intervals. These synchronizing bits 45 are applied preferably with the servo track writer 42 initially by radially positioning the track writer with its inboard edge positioned at track "0" and then controlling energization of the track writer in a manner recording the synchronizing bits 45 onto the servo surface 14. The track writer 42 is then indexed radially inwardly one-half step for centering upon track "0" and the synchronizing bit recording step is repeated. This process is repeated in one-half step increments, rather than in full-step increments, to permit simultaneous recording of the various servo bits "A" through "D" in the pattern to be described. When the servo track writer 42 is ultimately indexed to the radially innermost track position on the servo disk surface, the resultant synchronizing bits 45 comprise radial bands or segments in the form of stripes emanating outwardly from the center axis for disk rotation. These bands have their leading edges spaced apart by a predetermined time span during steady state disk rotation, such as by a span of about 12.8 microseconds. In addition, the trailing edge of each synchronizing bit 45 is positioned a predetermined time span following the associated ledding edge, such as a span of about 1,200 nanoseconds.

As shown further in FIG. 4, the illustrative bit frame 44 is further characterized by an intermediate code bit 46 recorded in the form of a radial band or stripe in the course of recording the synchronizing bits 45. This code bit 46 is positioned in time at a predetermined point between the associated pair of synchronizing bits 45, and further has a time width or span which differs from the time span of the other servo data, such as a time span of 600 nanoseconds. The presence of this code bit 46 permits the servo head 12, during disk drive operation, to distinguish between a first portion 48 and a second portion 50 of each bit frame 44.

Figure 2:
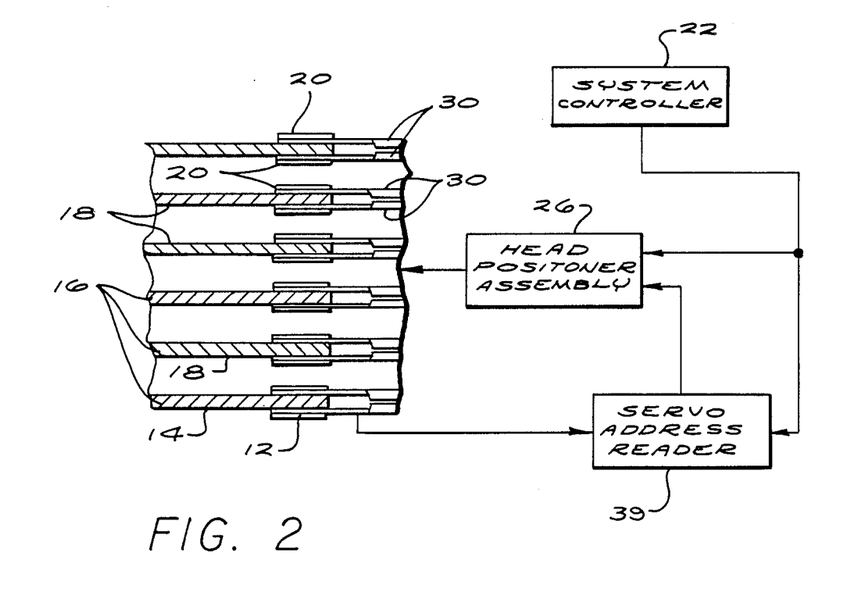
FIG. 2 is a schematic diagram illustrating multiple memory storage disks for use in the disk drive unit of FIG. 1, wherein one of the disks includes a dedicated servo surface and an associated servo head.

In accordance with one aspect of the invention, for some bit frames 44, the code bit 46 may be omitted. Such omission may occur in a regular pattern for the majority of each track, and further may include a sequence of successive code bit omissions at one region of the track. This arrangement can be detected during disk drive operation by the servo head 12 to identify a precise starting point for each disk revolution. By identifying the starting point, the servo head 12 and its related electronics may then count the succession of synchronizing bits 45 to identify precisely the rotational position of the servo disk as well as the other disks in the stack (FIG. 2).

For example, as viewed generally in FIG. 5, the servo head 12 can be designed to detect each synchronizing bit 45 of each track, such as by peak detecting the leading or the trailing edge thereof as a flux change to generate a train of synchronizing pulses 45'. The time span between these synchronizing pulses 45' is recognizable by the servo head 12 to discriminate and count the pulses 45' from a reference point. The occurrence of the code bits 46 is also detectable to generate an overlying train of code bit pulses 46'. When a succession of bit frames 44 are detected with the code bits 46 omitted, such as a succession of frames identifying the end of a track revolution as represented in dotted lines in FIG. 5, the synchronizing pulse 45' associated with the first bit frame for each revolution can be identified as the reference point.

With further reference to FIG. 4, the servo bits "A" though "D" are recorded within both of the first and second portions 48 and 50 of each bit frame 44 by the servo track writer 42. These servo bits, in accordance with the preferred form of the invention, are arranged in a repeating pattern for a small annular band of adjacent tracks as the track writer is indexed radially inwardly in one-half step increments, as previously described.

More particularly, at a predetermined time interval following the trailing edge of the synchronizing bit 45, the track writer 42 records a servo bit "A1" having its radially inboard edge aligned with track "0". This first servo bit "A1" is positioned within the first portion 48 of the bit frame 44. A similar servo bit "A2" is recorded within the second portion of the bit frame 44, at a predetermined time following the trailing edge of the code bit 46. While the time span between the synchronizing bit 45 or code bit 46 and the following "A" servo bit may vary, one preferred form of the invention records the "A1" bit at 800 nanoseconds following the synchronizing bit 45, and the "A2" bit at 600 nanoseconds following the code bit 46. Importantly, as shown in FIG. 4, the time durations of the "A1" and "A2" bits are different, such as a time duration of 450 nanoseconds for the "A1" bit and 750 nanoseconds for the "A2" bit. This combination of a short servo bit in the first portion 48 of the bit frame 44, together with a long servo bit in the second portion 50 of the bit frame provides information readable by the servo head 12, as will be described in more detail, in binary form such as a "0" digit. Alternately, a combination of a long servo bit in the first portion 48 and a short servo bit in the second portion 50 of the bit frame 44 is readable by the servo head as a "1" digit.

When the servo track writer 42 is indexed one-half step for centered alignment on track "0", additional servo bits are recorded in the first and second portions 48 and 50 of the bit frames. As shown in FIG. 4, a short servo bit "C1" is recorded within the first portion 48 with its leading edge at a predetermined position relative to the synchronizing bit 45, and with a short time span similar to the bit "A1". A long servo bit "C2" is then recorded in a similar fashion within the second portion 50, wherein the bit "C2" has a long time span corresponding with the bit "A2". The track writer 42 is then indexed another one-half step for alignment with track "1", and a pair of servo bits "B1" and "B2" are recorded respectively within the first and second portions 48 and 50 of the bit frame. These servo bits "B1" and "B2" also have respectively short and long time durations and are located at precise positions within their respective frame portions. After another one-half step index of the track writer 42 for alignment with track "2", a pair of respectively short and long bits "D1" and "D2" are recorded in the frame portions 48 and 50 and at predetermined positions therein. Finally, the track writer 42 is indexed for alignment on track "3", and the pattern of servo bit recordation is repeated by recording additional bits "A1" and "A2" at timed positions and spans corresponding with the bits "A1" and "A2" described previously. This succession of servo bit recordation is repeated until the last or radially innermost servo surface track is recorded.

Accordingly, the first portion 48 of each bit frame 44 includes a timed succession of servo bits "A1" through "D1" which overlap the tracks "0" through "3" in varying degrees, whereas the second portion 50 of the bit frame includes a similar timed succession of servo bits "A2" through "D2" to overlap the same tracks in a similar varying manner. This general pattern of servo bits is repeated for all of the bit frames 44 throughout the full revolution of tracks "0" through "3", and then repeated as the track writer moves radially inwardly through successive groups of four tracks. However, the arrangement of the short and long servo bits in the bit frames for any given track will exhibit a regular pattern for purposes of providing a distinct track address.

Figure 6:
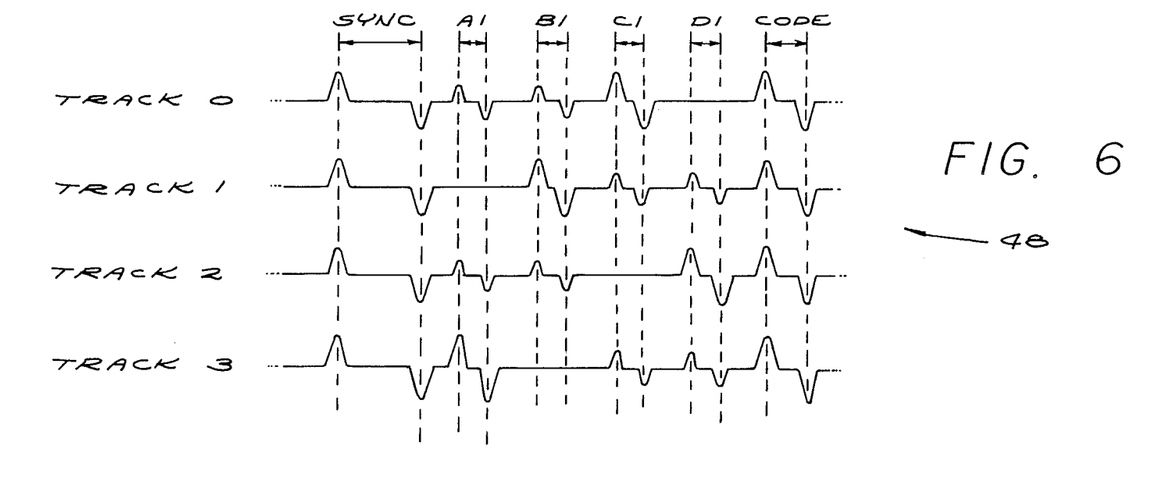
FIG. 6 is a graphic representation of flux change signals corresponding with first portions of bit frames on adjacent tracks of the dedicated servo surface.
Figure 7:
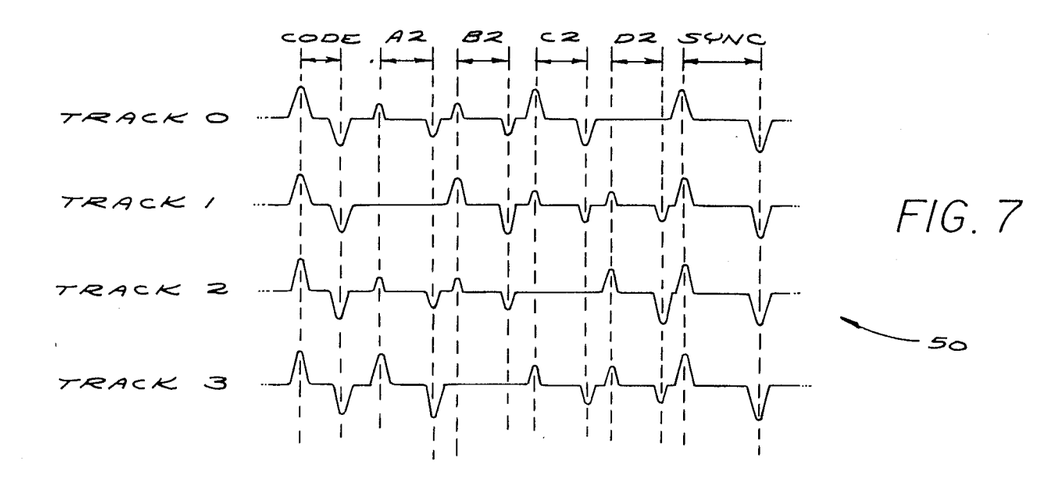
FIG. 7 is a graphic representation similar to FIG. 6, but corresponding with second portions of bit frames on adjacent tracks of the dedicated servo surface.

The above described pattern of servo bits is detectable by the servo head 12 during disk drive operation to identify the track aligned with the head by specific track address. More specifically, as shown in FIGS. 6 and 7, the servo head 12 has the capability to detect the various bits recorded on any specific track by peak detection of the flux changes represented by the leading and trailing edges of the bits. Importantly, the magnitudes of the detected flux changes are a function of the degree to which the detected bits track beneath the servo head. Moreover, this detection of the leading and trailing edge flux changes permits the servo head to distinguish by time duration between the various types of bits, such as the synchronizing bits 45, the code bits 46, and the various short and long servo bits "A" through "B".

With reference to track "0" in FIGS. 6 and 7, the servo head 12 initially detects the leading and trailing edges of the synchronizing bit 45. Thereafter, the head detects in sequence the leading and trailing edges of the "A1" and "B1" bits, with a magnitude of fifty per cent of the synchronizing bit 45, since these bits "A1" and "B1" are only one-half aligned with the servo head 12 when the head 12 is properly tracked on track "0". The servo head 12 then detects the edges of the "C1" bit with a full magnitude since that bit is centered on track "0". The head then fails to detect the "D1" bit which is fully misaligned with track "0" before detecting the leading and trailing edges of the code bit 46. The servo head 12 then detects in a similar sequence the servo bits recorded in the second portion 50 of the bit frame 44, as viewed in FIG. 7. However, since the servo bits "A2" through "D2" are longer in time, the time span between the detected leading and trailing edges of these servo bits is different from those detected in the first portion 48 of the bit frame 44.

The servo head 12 functions through the address reader 39 to generate position error signals of the type known in the art for purposes of tracking the head 12 with a selected servo track. More particularly, with reference to FIG. 8, the position error signals are generated in quadrature through a comparison of the leading and trailing edges of the various detected bits to provide a maximum position error signal when the leading and trailing edges of the bits are detected with equal magnitude, such that the magnitude of the position error signal decreases as the head moves away from alignment with the specified track. In a quadrature servo system, this provides a pair of sine-like error signals shown in FIG. 8 as a dotted line "SIN" curve for track "0" and even numbered tracks, and as a solid line "COS" curve for odd numbered tracks. The address reader 39 is designed to respond to these position error signals to maintain the head on a selected track. In other words, the address data is utilized for positioning mode purposes relative to a designated track.

Figure 9:
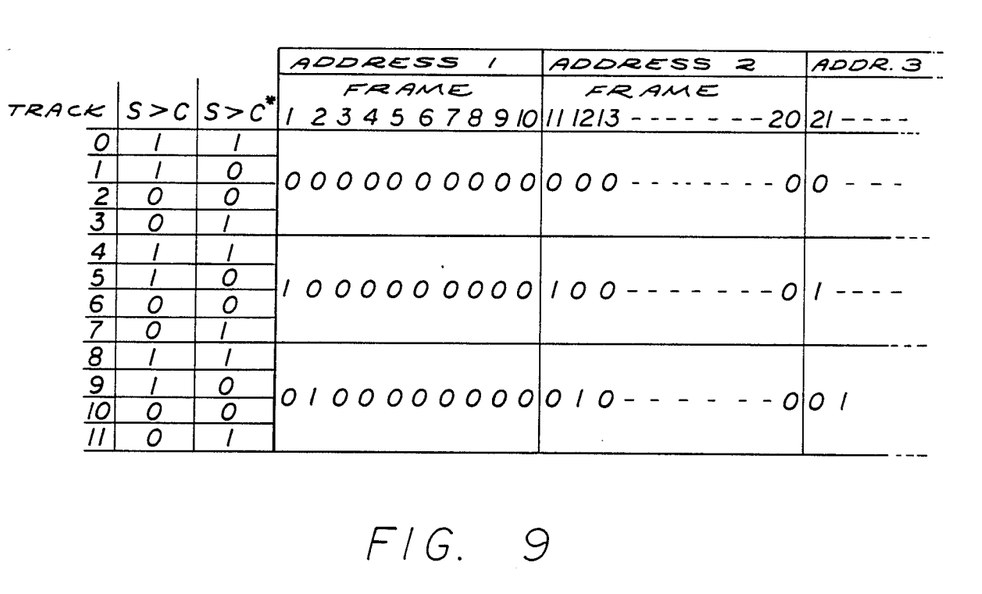
FIG. 9 is a chart illustrating the use of bit frame address information and position error signals to create unique multidigit addresses in binary code corresponding with each track on the dedicated servo surface.

Moreover, the servo address reader 39 is able to discriminate the time spans of the various bits detected as viewed in FIG. 7. That is, the system is able to identify each synchronizing bit 45, each code bit 46, and the intervening short or long servo bits. As stated previously herein, the servo address reader 39 interprets a combination of short servo bits in the first portion 48 of the bit frame 44 with long servo bits in the second portion 50 of the bit frame 44 as a "0" digit in binary code. Conversely, the reader 39 interprets the opposite combination, namely, long bits in the first portion 48 and short bits in the second portion 50 as a "1" digit in binary code. When a succession of several bit frames on each track is used to define a track address, each bit frame 44 can provide one primary digit of a multidigit address in binary code. In this regard, it will be understood that the address digits will preferably be written in so-called gray code, and the discussion herein of "binary" code, etc., is intended to encompass both binary and gray code techniques. This address information is depicted in FIG. 9 which charts each track with repeating groups of ten bit frames providing repeating ten primary digit addresses for each adjacent group of four tracks on the servo surface 14. For example, for tracks "0" through "3", the repeating bit frames 44 are recorded with combinations of short and then long servo bits to provide a ten digit address represented by ten "0's". The next group of four tracks "4" through "7" includes sets of ten bit frames defining a different binary address code, such as by recording the first bit frame of each ten-frame group to include long and then short servo bits, thereby defining as address code of a 37 1" followed by nine "0's". Similar variations may be used to provide each group of four tracks with a unique address code.

Figure 8:
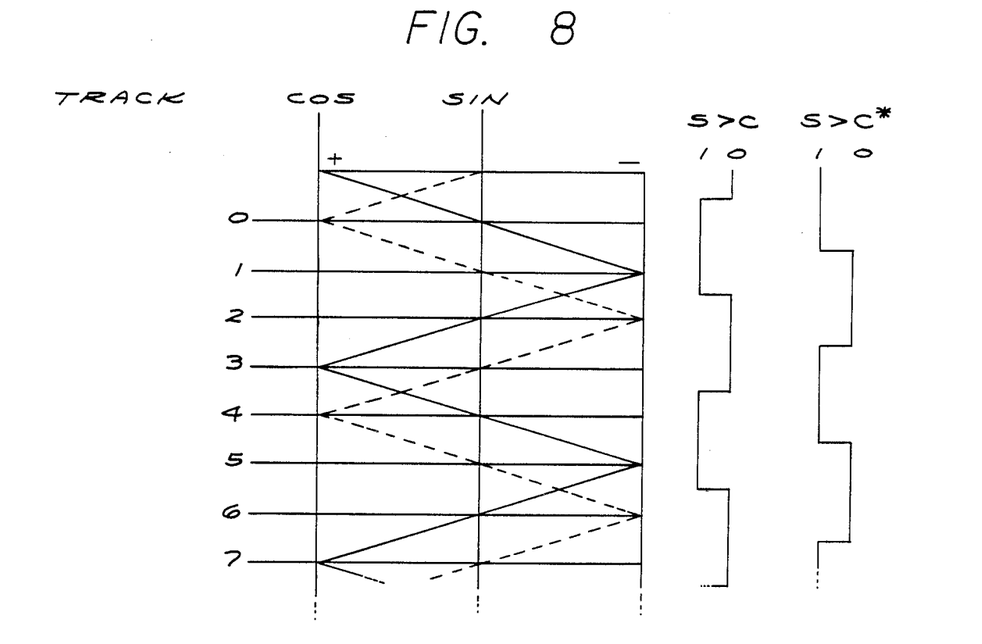
FIG. 8 is a graphic representation illustrating position error signals derived from the position of the servo head relative to adjacent tracks on the dedicated servo surface, and the use of such position error signals in quadrature to generate binary code signals representative of servo head crossover from one track to another.

Each track within any given group of four tracks can then be distinguished by comparison of the position error signals, described above, to provide a pair of secondary digits for the unique address code. More particularly, as shown in FIG. 8, and as known in the art, the quadrature position error signals can be compared to define transition points associated with track crossover points during head seek displacement, thereby permitting the servo head to seek and find a specific designated track from an initial reference point, such as track "0". However, in accordance with the invention, these position error signals are further compared to define a binary digit "1" when the "SIN" signal is greater that the "COS" signal, or a "0" digit with the "COS" signal is greater. Similarly, the error signals are compared to provide a "1" digit when the "SIN" signals is greater than the inverse of the "COS" signal (referred to in FIG. 8 as "C*"), or a "0" digit when the inverted "COS" signal is greater. These additional two binary digits comprising the secondary digits for the track address are shown for tracks "0" through "11" in FIG. 9 which indicates a code of "1" and "1" for track "0", a code of "1" and "0" for track "1", etc. As a result, a unique pair of secondary digits for the first through fourth track of each four-track set is provided. When the secondary digits are considered in combination with the primary digits derived from the bit frames 44, the servo head 12 and associated servo address reader 39 are able to identify each discrete track on the servo surface 14 for positive track identification.

The foregoing track identification servo system beneficially permits the servo head 12 to move rapidly to a specific track as commanded by the system controller 22, and to lock onto that track for accurate positioning of the remaining data heads 20 relative to the same track on their respective disk data surfaces. When the servo head 12 arrives at the commanded track, the servo head is able to identify the track by its unique address for purposes of confirming a proper track seek function without positioning error. If a positioning error exists, the servo head 12 is able to self-correct by virtue of the address reader 39 directing the head positioner assembly 26 to adjust head position. The use of first and second portions 48 and 50 for each bit frame 44 comprising a sequence of long-short or short-ling bits, beneficially provides positioning information for both types of bits for offsetting or averaging any errors which might be attributable to pulse crowding.

The track address identification and verification system of the invention permits the disk drive to be designed for relatively faster track seek and access times, in comparison with the prior art, since the servo head 12 and address reader 39 will self-correct any positioning errors, such as head overshoot. The positioner mechanism 34 of the positioner assembly 26 may thus be designed for initially and rapidly displacing the heads in a gross seek function to a position approximating the position of the specified track, after which the servo head and address reader will fine tune automatically for proper track alignment.

A variety of modifications and improvements to the servo address system will be apparent to those skilled in the art. For example, for each bit frame 44, compassing a sequence of long-short or short-long bits, beneficially provides positioning information for both types of bits for offsetting or averaging any errors which might be attributable to pulse crowding. The particular electronic construction of the address reader may vary widely but otherwise comprises conventional flux change detection components and signal generation and comparator circuitry associated therewith, as described herein. Accordingly, no limitation on the invention is intended by way of the foregoing description and accompanying drawings, except as set forth in the appended claims.

What is claimed is:

1. A servo address system for a computer disk drive unit having a plurality of memory storage disk surfaces, said address system comprising:

a servo head in operative association with one of the disk storage surfaces, said one disk surface comprising a dedicated servo surface; and servo data recorded in generally concentric tracks on said dedicated servo surface, said servo data being readable by said servo head and defining a unique track address for each of said concentric tracks;

said servo data comprising a timed succession of synchronizing bits recorded onto each of said tracks to define therebetween a plurality of bit frames, and a plurality of servo bits recorded within each of said bit frames in one of first and second distinct patterns for detection and reading by said servo head in binary code, a selected successive plurality of said bit frames for each of said tracks defining an address and having the servo bits thereof recorded in a regular pattern which repeats for each address, wherein each address is represented by a unique plurality of digits in binary code.

2. The servo address system of claim 1 wherein the selected successive plurality of said bit frames defining said address are repeated throughout the associated track.

3. The servo address system of claim 1 wherein a plurality of said bit frames further include a code bit disposed in time at a generally intermediate position therein.

4. The servo address system of claim 3 wherein said code bits recorded on said tracks of said dedicated servo surface are positioned generally in radial alignment.

5. The servo address system of claim 1 wherein said synchronizing bits recorded on said tracks of said dedicated servo surface are positioned generally in radial alignment.

6. The servo address system of claim 1 further including means for identifying a reference synchronizing bit for each of said tracks to demarcate the starting point of rotation of said dedicated servo surface relative to said servo head.

7. A servo address system for a computer disk drive unit having a plurality of memory storage disk surfaces, said address system comprising:

a servo head in operative association with one of the disk storage surfaces, said one disk surface comprising a dedicated servo surface; and servo data recorded in generally concentric tracks on said dedicated servo surface, said servo data being readable by said servo head and defining a unique track address for each of said concentric tracks;

said servo data comprising a timed succession of synchronizing bits recorded onto each of said tracks to define therebetween a plurality of bit frames each having a first portion and a second portion in timed succession, and a plurality of servo bits arranged in first and second distinct patterns and recorded within said first and second portions of each of said bit frames in first and second distinct pattern sequences, said first pattern sequence comprising said first pattern recorded within said first bit frame portion and said second pattern recorded within said second bit frame portion to define a "0" digit in binary code, and said second pattern sequence comprising said second pattern recorded within said first bit frame portion and said first pattern recorded within said second bit frame portion to define a "1" digit in binary code, said servo bits being for detection and reading by said servo head, and a selected successive plurality of said bit frames for each of said tracks defining an address and having the servo bits thereof recorded in a regular pattern which repeats for each address, wherein each address is represented by a plurality of digits in binary code.

8. The servo address system of claim 7 wherein said servo bits are recorded within said bit frames in a regular repeating pattern for each of a plurality of adjacent ones of said tracks to define a unique address for each of said adjacent tracks, and further including means for generating and comparing position error signals in quadrature to obtain additional signals representable in binary code to distinguish each of adjacent said tracks from each other.

9. The servo address system of claim 7 wherein the selected successive plurality of said bit frames defining said address are repeated throughout the associated track.

10. The servo address system of claim 7 wherein said first pattern comprises servo bits having a relatively short time span when detected by said servo head, and wherein said second pattern comprises servo bits having a comparatively longer time span when detected by said servo head.

11. The servo address system of claim 7 wherein a plurality of said bit frames further include a code bit disposed in time at a generally intermediate position therein.

12. A memory storage disk for a computer disk drive unit, comprising:

a dedicated servo surface on one side of said disk; and servo data recorded onto said dedicated servo surface in a plurality of concentric tracks;

said servo data defining, for each of said tracks, a track address repeated in succession throughout said track, said track address being defined by a repeating succession of a selected plurality of bit frames each having a plurality of servo bits recorded therein in one of first and second district patterns for detection and reading in binary code.

13. The memory storage disk of claim 12 wherein said servo bits are recorded within said bit frames in a regular repeating pattern for each of a plurality of adjacent ones of said tracks to define a unique address for each of said adjacent tracks, and further including means for generating position error signals in quadrature to obtain additional signals representable in binary code to distinguish each of adjacent said tracks from each other.

14. The memory storage disk of claim 12 a plurality of said bit frames further include a code bit disposed in time at a generally intermediate position therein.

15. A method of tracking a plurality of data heads relative to a corresponding plurality of computer disk data surfaces on a plurality of memory storage disks arranged in a stack for rotation together about a common axis, said method comprising:

recording servo data on one surface of a selected one of the memory storage disks, said one surface comprising a dedicated servo surface;

said recording step including the steps of recording servo data onto the dedicated servo surface in a plurality of generally concentric tracks, and in the form of a succession of individual bit frame for each of said tracks, with each bit frame including servo bits in one of first and second distinct patterns representable in binary code, a selected successive plurality of the bit frames defining an address which repeats throughout the tracks, the arrangement of servo bits within the address being unique to that track;

detecting and monitoring the servo data with a servo head to identify the track aligned therewith by address; and displacing the servo head through a seek step to alignment with a specified track by address, said servo head displacing step including concurrent displacement of the data heads into alignment with a corresponding track on their respective disk data surfaces.

* * * * *